US010221346B2

(12) United States Patent
Suen

(10) Patent No.: US 10,221,346 B2
(45) Date of Patent: Mar. 5, 2019

(54) REACTIVE HOT MELT ADHESIVES WITH IMPROVED ADHESION

(71) Applicant: Henkel IP & Holding GmbH, Duesseldorf (DE)

(72) Inventor: Wu Suen, Flemington, NJ (US)

(73) Assignee: Henkel IP & Holding GmbH, Duesseldorf (DE)

(*) Notice: Subject to any disclaimer, the term of this patent is extended or adjusted under 35 U.S.C. 154(b) by 137 days.

(21) Appl. No.: 15/202,614

(22) Filed: Jul. 6, 2016

(65) Prior Publication Data

US 2016/0333236 A1 Nov. 17, 2016

Related U.S. Application Data

(63) Continuation of application No. PCT/US2014/070256, filed on Dec. 15, 2014.

(60) Provisional application No. 61/927,306, filed on Jan. 14, 2014.

(51) Int. Cl.

| | | |
|---|---|---|
| *C09J 175/06* | (2006.01) | |
| *B32B 37/12* | (2006.01) | |
| *B32B 37/06* | (2006.01) | |
| *B32B 37/08* | (2006.01) | |
| *C08G 18/75* | (2006.01) | |
| *C08G 18/76* | (2006.01) | |
| *C08G 65/26* | (2006.01) | |
| *C08G 18/42* | (2006.01) | |
| *C08G 18/44* | (2006.01) | |
| *C08G 65/336* | (2006.01) | |
| *C08G 18/22* | (2006.01) | |
| *C08G 18/24* | (2006.01) | |
| *C08L 71/08* | (2006.01) | |

(52) U.S. Cl.

CPC ............ *C09J 175/06* (2013.01); *B32B 37/06* (2013.01); *B32B 37/08* (2013.01); *B32B 37/12* (2013.01); *C08G 18/227* (2013.01); *C08G 18/246* (2013.01); *C08G 18/42* (2013.01); *C08G 18/4202* (2013.01); *C08G 18/44* (2013.01); *C08G 18/755* (2013.01); *C08G 18/7671* (2013.01); *C08G 65/2639* (2013.01); *C08G 65/336* (2013.01); *C08L 71/08* (2013.01); *B32B 2037/1253* (2013.01); *C08G 2190/00* (2013.01)

(58) Field of Classification Search
None
See application file for complete search history.

(56) References Cited

U.S. PATENT DOCUMENTS

| | | | | |
|---|---|---|---|---|
| 3,632,557 | A | * | 1/1972 | Brode .................. C08G 18/10 528/28 |
| 3,979,344 | A | * | 9/1976 | Bryant .................. B32B 15/04 528/22 |
| 4,593,068 | A | | 6/1986 | Hirosu et al. |
| 4,783,504 | A | | 11/1988 | St. Clair et al. |
| 4,871,590 | A | | 10/1989 | Merz et al. |
| 5,097,053 | A | | 3/1992 | Baghdachi et al. |
| 5,210,150 | A | | 5/1993 | Prejean |
| 5,241,014 | A | | 8/1993 | Kehr et al. |
| 5,331,049 | A | | 7/1994 | Audett et al. |
| 5,346,939 | A | | 9/1994 | Moren et al. |
| 5,604,033 | A | | 2/1997 | Arthurs et al. |
| 5,669,940 | A | | 9/1997 | Stubbs |
| 5,994,474 | A | | 11/1999 | Wey et al. |
| 6,121,354 | A | | 9/2000 | Chronister |
| 6,204,350 | B1 | | 3/2001 | Liu et al. |
| 6,303,731 | B1 | | 10/2001 | Carlson et al. |
| 6,350,345 | B1 | | 2/2002 | Kotani et al. |
| 6,433,055 | B1 | | 8/2002 | Kleye et al. |
| 6,437,071 | B1 | | 8/2002 | Odaka et al. |
| 6,437,072 | B1 | | 8/2002 | Jyono et al. |
| 6,444,775 | B1 | | 9/2002 | Jyono et al. |
| 6,613,816 | B2 | | 9/2003 | Mahdi et al. |
| 6,642,309 | B2 | | 11/2003 | Komitsu et al. |
| 6,649,016 | B2 | | 11/2003 | Wu et al. |
| 6,664,323 | B2 | | 12/2003 | Lucas |
| 6,749,943 | B1 | | 6/2004 | Tangen et al. |
| 6,777,485 | B1 | | 8/2004 | Ito et al. |
| 6,803,412 | B2 | | 10/2004 | Nguyen-Misra et al. |
| 6,828,403 | B2 | | 12/2004 | Mahdi et al. |
| 6,967,226 | B2 | | 11/2005 | Shah |
| 7,067,563 | B2 | | 6/2006 | Klein et al. |
| 7,087,127 | B2 | | 8/2006 | Mahdi et al. |
| 7,091,298 | B2 | | 8/2006 | Schindler et al. |
| 7,153,911 | B2 | | 12/2006 | Yano et al. |
| 7,635,743 | B2 | | 12/2009 | Wintermantel et al. |
| 7,892,395 | B2 | | 2/2011 | Tribelhorn et al. |
| 8,101,681 | B2 | | 1/2012 | Kohl et al. |
| 8,247,079 | B2 | | 8/2012 | Griswold |
| 8,247,514 | B2 | | 8/2012 | Griswold |
| 8,293,368 | B2 | | 10/2012 | Jucker et al. |
| 8,362,123 | B2 | | 1/2013 | Kohl et al. |
| 8,623,170 | B2 | | 1/2014 | Oertli et al. |
| 8,748,511 | B2 | | 6/2014 | Bolte et al. |
| 9,334,433 | B2 | | 5/2016 | Oertli et al. |
| 9,428,677 | B2 | | 8/2016 | Suen |

(Continued)

FOREIGN PATENT DOCUMENTS

| | | |
|---|---|---|
| DE | 4000695 A1 | 7/1991 |
| DE | 19516457 | 11/1995 |

(Continued)

OTHER PUBLICATIONS

Silquest A-1100 technical data sheet, Mar. 30, 2018 (Year: 2018).*

(Continued)

*Primary Examiner* — Christopher M Rodd

(74) *Attorney, Agent, or Firm* — James E. Piotrowski

(57) ABSTRACT

The present specification relates to moisture reactive hot melt adhesive compositions comprising a silane reactive plasticizer and the reaction product of (i) a semi-crystalline polyol and (ii) a polyisocyanate and (iii) an aminosilane; the production of such adhesives; and the use of such adhesives.

22 Claims, No Drawings

(56) References Cited

U.S. PATENT DOCUMENTS

| | | |
|---|---|---|
| 2002/0084030 A1 | 7/2002 | Kotani et al. |
| 2002/0120088 A1* | 8/2002 | Hellwig ............... C08G 18/12 528/44 |
| 2004/0180155 A1* | 9/2004 | Nguyen-Misra ....... C08G 18/10 428/34 |
| 2004/0181007 A1 | 9/2004 | Acevedo et al. |
| 2005/0043455 A1 | 2/2005 | Hohner et al. |
| 2005/0215702 A1 | 9/2005 | Slark et al. |
| 2006/0142532 A1 | 6/2006 | Wintermantel et al. |
| 2006/0270807 A1 | 11/2006 | Zhu et al. |
| 2008/0012553 A1 | 5/2008 | Mack |
| 2008/0125539 A1 | 5/2008 | Mack |
| 2008/0312401 A1 | 12/2008 | Sato |
| 2009/0000549 A1 | 1/2009 | Zhiqing et al. |
| 2009/0042040 A1 | 2/2009 | Paul et al. |
| 2009/0010540 A1 | 4/2009 | Karjala et al. |
| 2009/0022674 A1 | 9/2009 | Teysseire |
| 2012/0322926 A1 | 12/2012 | Suen et al. |
| 2014/0027056 A1 | 1/2014 | Suen |
| 2014/0329074 A1 | 11/2014 | Janke et al. |
| 2016/0326408 A1 | 11/2016 | Suen et al. |

FOREIGN PATENT DOCUMENTS

| | | |
|---|---|---|
| DE | 102004055450 | 5/2006 |
| EP | 0310704 | 6/1994 |
| EP | 1788035 | 5/2007 |
| GB | 2197326 | 5/1988 |
| GB | 2292154 | 2/1996 |
| JP | S60235747 | 11/1985 |
| JP | 1163281 | 12/1987 |
| JP | 1301740 | 12/1989 |
| JP | 2150488 | 6/1990 |
| JP | H04335080 A | 11/1992 |
| JP | 10251357 | 9/1998 |
| JP | 3030020 | 6/2000 |
| JP | 3621678 | 9/2003 |
| JP | 4176028 | 6/2004 |
| JP | 2006291021 A | 10/2006 |
| JP | 2006523253 A | 10/2006 |
| JP | 2009024107 A | 2/2009 |
| RU | 2011145365 A | 7/2013 |
| WO | 8911506 | 11/1989 |
| WO | 8911514 | 11/1989 |
| WO | 9001507 | 2/1990 |
| WO | 9106580 | 5/1991 |
| WO | 9108240 | 6/1991 |
| WO | WO-0112694 A1 * | 2/2001 ......... C08G 59/4085 |
| WO | 06028927 | 3/2006 |
| WO | 2006117338 A2 | 11/2006 |
| WO | 2007122261 | 11/2007 |
| WO | 2008116033 | 9/2008 |
| WO | 2010033383 | 3/2010 |
| WO | 2010115715 | 10/2010 |
| WO | 2011115721 | 9/2011 |
| WO | 2014072396 A1 | 5/2014 |

OTHER PUBLICATIONS

International Search Report issued in connection with International Patent Application No. PCT/US2010/061207 . dated Aug. 31, 2011.

C.W. Paul, "Hot Melt Adhesives", in Adhesion Science and Engineering-2, Surfaces, Chemistry and Applications, p. 718, M. Chaudhury and A.V. Pocius eds., Elsevier, New York (2002).

Michael J. Owen, "Coupling Agents: chemical bonding at interfaces", in Adhesion Science and Engineering-2, Surfaces, Chemistry and Applications, p. 403, M. Chaudhury and A.V. Pocius eds., Elsevier, New York (2002).

International Search Report for PCT/US2008/072590.

* cited by examiner

REACTIVE HOT MELT ADHESIVES WITH IMPROVED ADHESION

FIELD OF THE INVENTION

This disclosure relates to silane reactive hot melt adhesive compositions comprising a silane reactive plasticizer and a silane modified polyester polymer, the production of such adhesives and the use of such adhesives.

BACKGROUND OF THE INVENTION

Hot melt adhesive compositions are solid at room temperature. Upon application of heat, melt to a liquid or fluid state in which molten form they are applied to a substrate. On cooling, the adhesive composition regains its solid form. The hard phase(s) formed upon cooling the adhesive composition impart all of the cohesion (strength, toughness, creep and heat resistance) to the final bond. Hot melt adhesive compositions are thermoplastic and can be heated to a fluid state and cooled to a solid state repeatedly. Hot melt adhesive compositions do not include water or solvents.

Curable or reactive hot melt adhesive compositions are also solid at room temperature and, upon application of heat, melt to a liquid or fluid state in which molten form they are applied to a substrate. On cooling, the adhesive composition regains its solid form. The hard phase(s) formed upon cooling the adhesive composition and prior to curing impart initial or green strength to the bond. The reactive hot melt adhesive composition can cure by a chemical crosslinking reaction upon exposure to suitable conditions such as exposure to moisture. Before curing the adhesive composition remains thermoplastic and can be remelted and resolidified. Once cured, the adhesive composition is in an irreversible solid form and is no longer thermoplastic. Reactive hot melt adhesive compositions are stored in the absence of water to prevent premature crosslinking. The crosslinked adhesive composition provides additional strength, toughness, creep resistance and heat resistance to the final bond. Reactive hot melt adhesive compositions can provide higher strength and heat resistance compared to non-curable hot melt adhesive compositions.

The ability of a reactive hot melt adhesive composition to cool so that the solidified but non-crosslinked composition can quickly bond parts together is called green strength. An adhesive composition that quickly develops green strength is desirable in commercial operations as it allows bonded parts to be further processed quickly. Reactive hot melt adhesive compositions will continue to react with moisture after solidification so that strength of the adhesive bond between parts will continue to rise. A high cured strength is desirable in commercial operations as it allows stressed parts to be bonded.

The majority of reactive hot melts are moisture-curing urethane hot melt compositions. The reactive components of urethane hot melt compositions consist primarily of isocyanate terminated polyurethane prepolymers containing urethane groups and reactive isocyanate groups that react with surface or atmospheric moisture to chain extend and form a new polyurethane polymer. Polyurethane prepolymers are conventionally obtained by reacting diols with diisocyanates. Upon cooling the isocyanate groups in the polyurethane prepolymer react with moisture from the environment to form a crosslinked irreversible solid bond.

Moisture-curing urethane hot melt adhesive compositions have certain disadvantages. One disadvantage is the residual monomer content of polyisocyanates, more particularly the more volatile diisocyanates. Some moisture-curing urethane hot melt adhesive compositions can contain significant amounts of unreacted monomeric diisocyanates. At the hot melt application temperature (typically at 100° C. to 170° C.) monomeric diisocyanates have a considerable vapor pressure and may be partly expelled in gaseous form. The isocyanate vapors may be toxic, irritating and have a sensitizing effect, so that precautionary measures have to be taken in the application process.

Silane reactive hot melt adhesive compositions have been developed to solve these issues common to isocyanate reactive hot melt compositions. Silane reactive hot melt adhesive compositions are also solid at room temperature and, upon application of heat, melt to a liquid or fluid state in which molten form they are applied to a substrate. On cooling, the composition regains its solid form. Silane reactive hot melt adhesive compositions are based on silane modified polymers that comprise moisture reactive silane groups that form siloxane bonds when exposed to moisture such as in the atmosphere. Silane reactive hot melt adhesive compositions offer good cured adhesion and since there is no isocyanate monomer there are no concerns about emission of isocyanate monomer vapor. However, many silane reactive hot melt adhesive compositions develop green strength slower than reactive polyurethane hot melt adhesive compositions.

It is difficult to find one reactive hot melt adhesive composition that has a commercially desirable combination of green strength, cured strength, working life and environmental safety. There remains a need for a silane reactive hot melt adhesive composition that has a desirable combination of properties for commercial use including quick development of green strength, a long working life and high final (cured) strength.

BRIEF SUMMARY OF THE INVENTION

It has been discovered that a silane reactive hot melt adhesive composition comprising a combination of selected silane modified polyester polymers and selected silane reactive plasticizers has very good adhesion to various substrates, a fast setting speed (green strength) and contains no isocyanate monomers.

The disclosed compounds include any and all isomers and stereoisomers. In general, unless otherwise explicitly stated the disclosed materials and processes may be alternately formulated to comprise, consist of, or consist essentially of, any appropriate components, moieties or steps herein disclosed. The disclosed materials and processes may additionally, or alternatively, be formulated so as to be devoid, or substantially free, of any components, materials, ingredients, adjuvants, moieties, species and steps used in the prior art compositions or that are otherwise not necessary to the achievement of the function and/or objective of the present disclosure.

When the word "about" is used herein it is meant that the amount or condition it modifies can vary some beyond the stated amount so long as the function and/or objective of the disclosure are realized. The skilled artisan understands that there is seldom time to fully explore the extent of any area and expects that the disclosed result might extend, at least somewhat, beyond one or more of the disclosed limits. Later, having the benefit of this disclosure and understanding the concept and embodiments disclosed herein, a person of ordinary skill can, without inventive effort, explore beyond the disclosed limits and, when embodiments are found to be without any unexpected characteristics, those embodiments are within the meaning of the term about as used herein.

DETAILED DESCRIPTION OF THE INVENTION

The disclosures of all documents cited herein are incorporated in their entireties by reference.

The silane reactive hot melt adhesive composition comprises one or more silane modified polyester polymers and one or more silane reactive plasticizers. The silane reactive hot melt adhesive composition is free of isocyanate monomers.

The silane reactive plasticizer has an organic backbone, bearing one or more terminal or pendant reactive silane groups. The reactive silane groups comprise Si—OH moieties or groups that can react in the presence of water to form Si—OH moieties. Preferred reactive silane groups include silanol and silyl alkoxy. The Si—OH moieties present or formed in the presence of water can condense with each other or with reactive species on the adherent surfaces. The backbone of the silane reactive plasticizer can be a homopolymer, a physical blend of different polymer moieties or a copolymer with segments of different polymeric moieties. Polymeric moieties useful for a silane reactive plasticizer backbone include silicone, polyether, polycarbonate, polyisobutylene, ethylene vinyl acetate and polyacrylate. In some embodiments the polymer backbone for the silane reactive plasticizer can be an acrylate modified polyether backbone (prepared for instance as described in U.S. Pat. No. 6,350,345, the contents of which are incorporated reference). In some embodiments the silane reactive plasticizer backbone can be free of silicon atoms. The silane reactive plasticizer can preferably be represented by the formulas $$R\text{-}[A\text{-}Si(C_xH_{2x+1})_n(OH)_{3-n}]_z$$

and $$R\text{-}[A\text{-}Si(C_xH_{2x+1})_n(OC_yH_{2y+1})_{3-n}]_z$$

wherein R is the polymer backbone;
—$Si(C_xH_{2x+1})_n(OC_yH_{2y+1})_{3-n}$ is a reactive silane moiety comprising silyl alkoxy group(s);
—$Si(C_xH_{2x+1})_n(OH)_{3-n}$ is a silanol moiety;
A is a linkage that links the silane to polymer backbone R;
n=0, 1 or 2;
x and y are, independently a number from 1 to 12.

The number average molecular weight (Mn) of the silane reactive plasticizer will range from about 500 to about 120,000, preferably from 1,000 to 60,000.

The number of silane groups z will desirably be more than one per molecule (to generate a fully cured network), and advantageously be at least two per molecule. Preferably, z is 2 so that the silane functional polymer is telechelic or end-functionalized, where most or all the ends are silane reactive. The number of alkoxy groups per silane end group (3–n) is preferably 2 or 3 (n=1 or 0).

Some suitable silane reactive plasticizers include silane modified polyether polymers commercially available, for example, from Momentive Performance Material under the trade name SPUR; from Henkel Corporation under the trade name FLEXTEC; and from Kaneka Corporation under the trade name MS polymer and SILIL polymer, STP polymers available from Wacker Chemical and SPE polymers available from Evonik. Liquid (at room temperature) polyacrylate backbone silane reactive plasticizers are available under the tradename XMAP from Kaneka Corporation. Liquid (at room temperature) polyisobutylene backbone silane reactive plasticizers are available under the tradename EPION from Kaneka Corporation.

Other exemplary silane reactive plasticizers can be prepared starting from polycarbonate polyols such as Novomer materials available from Novomer Inc and reacting the polyol with polyisocyanate to form an isocyanate functional prepolymer and reacting the prepolymer with an aminosilane to add the silane reactive group to the polycarbonate backbone.

Other exemplary silane reactive plasticizers can be prepared starting from ethylene vinyl acetate (EVA) polymers and grafting with vinyl trimethoxy silane (VTMS), preferably with a catalyst such as peroxide to form a silane grafted EVA. The silane groups will be pendant and not terminal. The grafting reaction can be done in a commercial extruder under conditions known to a skilled person.

The silane reactive plasticizer is advantageously amorphous in form and liquid at room temperature to aid wetting of the final composition on a substrate, to add flexibility to the cured adhesive composition and aid mobility of the reactive sites in the molten composition.

The amount of silane reactive plasticizer in the hot melt adhesive composition will depend on its molecular weight and functionality, but will typically be from 0 to 50 weight %, advantageously 5 to 35 weight %, and more advantageously from 10 to 30 weight %, based on the total weight of the adhesive composition.

The silane modified polyester polymer has a polyester backbone, bearing one or more terminal or pendant silane or alkoxylated silane groups. "Polyester" refers to polymers which contain multiple ester linkages in the polymer backbone. A polyester can be either linear or branched. The silane groups are hydrolyzed by water to silanol groups, which can condense with each other, with another silane modified polymer or with reactive species on the adherent surfaces. The silane modified polyester polymer will have a polyester polymer backbone. The silane modified polymer backbone can be free of silicon atoms.

The silane modified polyester polymer can be represented by the formula $$R\text{-}[A\text{-}Si(C_xH_{2x+1})_n(OC_yH_{2y+1})_{3-n}]z$$

wherein R is the polyester backbone;
A is a linkage that links the silane to polymer backbone R;
n=0, 1 or 2;
x and y are, independently a number from 1 to 12.

The number of silane groups z will preferably be more than one per molecule (to generate a fully cured network), and more preferably at least two per molecule. More preferably, the silane functional polymer is telechelic or end-functionalized, where most or all the ends are silane functional. The number of alkoxy groups per silane end group, 3–n, is preferably 2 or 3 (n=1 or 0).

The silane modified polyester polymer can be prepared as follows. A polyester polyol is provided. Advantageously, the polyester polyol is semi-crystalline and not amorphous. Use of semi-crystalline polyols enhances strength of the final composition as compared to amorphous polyols. Useful polyester polyols include those polyester polyols formed from the condensation of one or more polyhydric alcohols having from 2 to 15 carbon atoms with one or more polycarboxylic acids having from 2 to 14 carbon atoms. Examples of suitable polyhydric alcohols include ethylene glycol, propylene glycol such as 1,2-propylene glycol and 1,3-propylene glycol, glycerol, pentaerythritol, trimethylolpropane, 1,4,6-octanetriol, butanediol, pentanediol, hexanediol, dodecanediol, octanediol, chloropentanediol, glycerol monallyl ether, glycerol monoethyl ether, diethylene glycol, 2-ethylhexanediol-1,4,cyclohexanediol-1,4,1,2,6-hexanetriol, 1,3,5-hexanetriol, 1,3-bis-(2-hydroxyethoxy)propane and the like. Examples of polycarboxylic acids include phthalic acid, isophthalic acid, terephthalic acid, tetrachlorophthalic acid, maleic acid, dodecylmaleic acid, octadecenylmaleic acid, fumaric acid, aconitic acid, trimellitic acid, tricarballylic acid, 3,3'-thiodipropionic acid, succinic acid, adipic acid, malonic acid, glutaric acid, pimelic acid, sebacic acid, cyclohexane-1,2-dicarboxylic acid, 1,4-cyclohexadiene-1,2-dicarboxylic acid, 3-methyl-3,5-cyclohexadiene-1,2-dicarboxylic acid and the corresponding acid anhydrides, acid chlorides and acid esters such as phthalic anhydride, phthaloyl chloride and the dimethyl ester of phthalic acid. Preferred polycarboxylic acids are the aliphatic and cycloaliphatic dicarboxylic acids containing no more than 14 carbon atoms. Useful polyester polyols are commercially available. Polyester polyol can also include polycaprolactones. The composition of a polyester polyol can also contain recycled content and/or renewable content, such as Terrin polyols by Invista. These polyester polyol can be used in lieu of or in combination with other commercial polyester polyols in formulation. Some exemplary polyester polyols include Dynacoll 7360 (Evonik), Fomrez 66-32 (Crompton) and Stepanol S-105-30 (Stepan), Capa 2302 (Perstorp) and Terrin 168, Terrin 170 (Invista).

The polyester polyol is reacted with excess polyisocyanate to provide an intermediate compound having NCO groups. As used herein a polyisocyanate is a molecule having more than one NCO group. Advantageously the polyisocyanate has a functionality greater than one and equal or less than 2 to avoid unwanted crosslinking during preparation of the hot melt adhesive. Useful polyisocyanates include alkylene diisocyanates, cycloalkylene diisocyanates, aromatic diisocyanates and aliphatic-aromatic diisocyanates. Specific examples of suitable isocyanate-containing compounds include, but are not limited to, ethylene diisocyanate, ethylidene diisocyanate, propylene diisocyanate, butylene diisocyanate, trimethylene diisocyanate, hexamethylene diisocyanate, toluene diisocyanate, cyclopentylene-1,3-diisocyanate, cyclo-hexylene-1,4-diisocyanate, cyclohexylene-1,2-diisocyanate, 4,4'-diphenylmethane diisocyanate, 2,2-diphenylpropane-4,4'-diisocyanate, xylylene diisocyanate, 1,4-naphthylene diisocyanate, 1,5-naphthylene diisocyanate, m-phenylene diisocyanate, p-phenylene diisocyanate, diphenyl-4,4'-diisocyanate, azobenzene-4,4'-diisocyanate, diphenylsulphone-4,4'-diisocyanate, 2,4-tolylene diisocyanate, dichlorohexa-methylene diisocyanate, furfurylidene diisocyanate, 1-chlorobenzene-2,4-diisocyanate, and the like. While such compounds are commercially available, methods for synthesizing such compounds are well known in the art. Advantagous polyisocyanates are methyenebisphenyldiisocyanate (MDI), isophoronediisocyante (IPDI), and hydrogenated MDI (HMDI) and toluene diisocyanate (TDI). Particularly advantageous polyisocyanates include MDI and IPDI.

A primary or secondary aminosilane is reacted with NCO groups on the intermediate compound to convert substantially all of NCO groups into silane groups and provide the silane modified polyester polymer. Advantageously the aminosilane is one comprising a primary amino group. One useful aminosilane with a primary amino group is Silquest A-1110.

Preferred silane modified polyester polymers have a linear, aliphatic backbone. Such linear aliphatic backbones provide the cured composition with higher adhesion.

The amount of silane modified polyester polymer in the composition will depend on its molecular weight and functionality, but will typically be from 50 to 98 weight %, advantageously 60 to 95 weight %, and more advantageously from 65 to 85 weight %, based on the total weight of the adhesive composition.

The silane reactive hot melt adhesive composition can optionally comprise tackifier. The tackifier should be compatible with the silane modified polymers. The tackifier choices include natural and petroleum-derived materials and combinations thereof as described in C. W. Paul, "Hot Melt Adhesives," in Adhesion Science and Engineering-2, Surfaces, Chemistry and Applications, M. Chaudhury and A. V. Pocius eds., Elsevier, New York, 2002, p. 718, incorporated by reference herein.

Useful tackifiers for the disclosed adhesive composition include natural and modified rosin, aromatic tackifier or mixtures thereof. Useful natural and modified rosins include gum rosin, wood rosin, tall oil rosin, distilled rosin, hydrogenated rosin, dimerized rosin, resinates, and polymerized rosin; glycerol and pentaerythritol esters of natural and modified rosins, including, for example as the glycerol ester of pale, wood rosin, the glycerol ester of hydrogenated rosin, the glycerol ester of polymerized rosin, the pentaerythritol ester of hydrogenated rosin, and the phenolic-modified pentaerythritol ester of rosin. Examples of commercially available rosins and rosin derivatives that can be useful include Sylvalite RE 110L, Sylvares RE 115, and Sylvares RE 104 available from Arizona Chemical; Dertocal 140 from DRT; Limed Rosin No. 1, GB-120, and Pencel C from Arakawa Chemical. One preferred natural and modified rosin is a rosin ester tackifier such as KE-100, available from Arakawa Chemical Co. Another preferred rosin ester tackifier is a Komotac 2110 from Komo Resins. Useful aromatic tackifiers include styrenic monomers, styrene, alpha-methyl styrene, vinyl toluene, methoxy styrene, tertiary butyl styrene, chlorostyrene, coumarone, indene monomers including indene, and methyl indene. Preferred are aromatic hydrocarbon resins that are phenolic-modified aromatic resins, $C_9$ hydrocarbon resins, aliphatic-modified aromatic $C_9$ hydrocarbon resins, $C_9$ aromatic/aliphatic olefin-derived and available from Sartomer and Cray Valley under the trade name Norsolene and from Rutgers series of TK aromatic hydrocarbon resins. Other preferred aromatic tackifiers are alpha-methyl styrene types such as Kristalex 3100, Kristalex 5140 or Hercolite 240, all available from Eastman Chemical Co.

If used the tackifier component will usually be present in an amount of from about 0 to 40 weight %, advantageously from about 0 to 30, based on the total weight of the adhesive composition.

The silane reactive hot melt adhesive composition can optionally comprise an acrylic polymer or copolymer (polyacrylate). The acrylic polymer can improve green strength of the cooled hot melt adhesive composition. The acrylic polymer can be either reactive with the silane moieties present in other compounds or non-reactive with the silane moieties. A silane reactive acrylic polymer comprises groups such as carboxylic acid, amine, thiol and hydroxyl that react with silane moieties. A preferred silane reactive group is carboxylic acid. The number of groups should be sufficient such that a significant amount, at least 5%, of the acrylic polymer is grafted to the silane modified materials via the silane groups. The acrylic polymer can be free of silicon atoms. A non-silane reactive acrylic polymer does not include groups that are reactive with the silane moieties. One useful family of reactive acrylic polymers is Elvacite from INEOS Acrylics.

The amount of solid acrylic polymer in the adhesive composition will depend on a number of factors, including the glass transition temperature and molecular weight of the acrylic polymer, but, if used, will typically be present in an amount of from about 0 to about 40 weight %, based on the total weight of the adhesive composition.

The silane reactive hot melt adhesive composition can optionally comprise a catalyst. Suitable curing agents for the silane groups are described in U.S. Patent Publication No. 2002/0084030, and incorporated by reference herein. Exemplary catalyst includes bismuth compounds such as bismuth carboxylate and bismuth neodecanoate; titanium alkoxides (TYZOR® types, available from DuPont); tertiary amines such as bis(2-morpholinoethyl) ether, 2,2'-Dimorpholino Diethyl Ether (DMDEE) and triethylene diamine; zirconium complexes (KAT XC6212, K-KAT XC-A209 available from King Industries, Inc.); aluminum chelates (K-KAT 5218, K-KAT 4205 available from King Industries, Inc.), KR types (available from Kenrich Petrochemical, Inc.); and other organometallic compounds based on Zn, Co, Ni, and Fe and the like. The level of catalyst in the silane reactive hot melt adhesive composition will depend on the type of catalyst used, but can range from about 0 to about 5 weight %, advantageously from about 0 to about 1 weight %, based on the total weight of the adhesive composition. Catalysts comprising tin should not be used as they appear to prematurely gel the composition or give poor results.

The silane reactive hot melt adhesive composition can optionally comprise a moisture scavenger to extend pot life, such as vinyl trimethoxy silane or methacryloxypropyltrimethoxysilane. The level of moisture scavenger employed can be from 0 to 15% and preferably from 0 to 5%, based on the total weight of the adhesive composition.

The adhesive composition can optionally comprise an adhesion promoter or coupling agent which promotes bonding of the composition to a substrate. Examples are described in: Michel J. Owen, "*Coupling agents: chemical bonding at interfaces*", in Adhesion Science and Engineering-2, Surfaces, Chemistry and Applications, M. Chaudhury and A. V. Pocius eds., Elsevier, New York, 2002, p. 403, incorporated by reference herein. Preferred adhesion promoters include organo-silanes which can link the silane-functional polymer to the surface such as amino silanes and epoxy silanes. Some exemplary aminosilane adhesion promoters include 3-aminopropyltrimethoxysilane, 3-aminopropyltriethoxysilane, N-(2-aminoethyl-3-aminopropyl)trimethoxysilane, 3-aminopropylmethyldiethoxysilane, 4-amino-3,3-dimethylbutyltrimethoxysilane, N-(n-butyl)-3-aminopropyltrimethoxysilane, 1-butanamino-4-(dimethoxymethylsilyl)-2,2-dimethyl, (N-cyclohexylaminomethyl)triethoxysilane, (N-cyclohexylaminomethyl)-methyldiethoxysilane, (N-phenylaminoethyl)trimethoxysilane, (N-phenylaminomethyl)-methyldimethoxysilane or .gamma.-ureidopropyltrialkoxysilane. Particularly preferred amino silanes include 3-aminopropyltrimethoxysilane, 3-aminopropyltriethoxysilane. Some exemplary epoxy silane adhesion promoters include 3-glycidyloxypropyltrimethoxysilane, 3-glycidyloxypropyltriethoxysilane or beta-(3,4-epoxycyclohexyl)ethyltrimethoxysilane. Other useful adhesion promoters include oligomeric aminosilanes or formulated oligomeric silanes, such as Dynasylan 1146 or Sivo203. Other silane adhesion promoters include mercaptosilanes. Some exemplary mercaptosilane adhesion promoters include 3-mercaptopropyltrimethoxysilane, 3-mercaptopropylmethyldimethoxysilane or 3-mercaptopropyltriethoxysilane. The level of adhesion promoter employed can be from about 0 to 15 weight %, preferably 0 to 10 weight % and more preferably 0 to 5 weight %, based on the total weight of the adhesive composition. The adhesion promoter, if more reactive to moisture than the other silane containing components, can also serve as a moisture scavenger.

The silane reactive hot melt adhesive composition can optionally comprise conventional additives known to a person skilled in the art. Conventional additives which are compatible with a composition according to this invention may simply be determined by combining a potential additive with the composition and determining if they remain homogenous. Non-limiting examples of suitable additives include, without limitation, fillers, plasticizers, defoamers, rheology modifiers, air release agents and flame retardants. The total level of additives will vary depending on amount of each particular additive needed to provide the silane reactive hot melt adhesive composition with desired properties. The level of additives can be from 0 to 50%.

An exemplary silane reactive hot melt adhesive composition is shown below.

| component | range (weight %) | preferred range (weight %) | most preferred range (weight %) |
|---|---|---|---|
| silane reactive plasticizer | 0-50 | 5-35 | 10-30 |
| polyisocyanate | 3-15 | 6-10 | |
| polyester polyol | 40-90 | 50-80 | |
| Aminosilane reagent | 2-15 | 4.5-10 | |
| silane modified polyester polymer | 50-98 | 60-95 | 65-85 |
| tackifier | 0-40 | 0-30 | |
| acrylic polymer | 0-40 | | |
| catalyst | 0-5 | 0-1 | |
| moisture scavenger | 0-15 | 0-5 | |
| adhesion promoter | 0-15 | 0-5 | |
| additives | 0-50 | | |
| weight ratio of silane modified polyester polymer to silane reactive plasticizer | >1 to 1 | >1.2 to 1 | |
| equivalent ratio of isocyanate to polyester polyol | >1 to 1 | >1.4 to 1 | |

The silane reactive hot melt adhesive composition is preferably free of water and/or solvent in either the solid and/or molten form.

The silane reactive hot melt adhesive composition can be prepared by mixing the non-reactive components with heat until homogeneously blended. The mixer is placed under vacuum to remove moisture followed by heated mixing of the reactive components. The silane reactive hot melt adhesive composition is typically solid at room temperature. In some embodiments the silane reactive hot melt adhesive composition is solid at temperatures below 25° C. and becomes molten and fluid when heated to 120° C.

The silane modified polyester polymer and the silane reactive plasticizer are not believed to react or form a copolymer during preparation of the silane reactive hot melt adhesive composition. The disclosed silane reactive hot melt adhesive composition is molecularly different from copolymer hot melt adhesives before use. Upon exposure of the silane reactive hot melt adhesive composition to water the silyl moieties of the silane modified polyester polymer and the silane reactive plasticizer crosslink with each other to form a cross linked network of both types of molecules. The disclosed silane reactive hot melt adhesive composition is molecularly different from copolymer hot melt adhesives after curing. The disclosed silane reactive hot melt adhesive composition is isocyanate monomer free and provides surprising and advantageous high adhesion over a broad range of substrates.

The silane reactive hot melt adhesive compositions can be used to bond articles together by applying the hot melt adhesive composition in molten form to a first article, bringing a second article in contact with the molten composition applied to the first article. After application of the second article the silane reactive hot melt adhesive composition is subjected to conditions that will allow it to solidify, bonding the first and second articles. Solidification occurs when the liquid melt is subjected to a temperature below the melting point, typically room temperature. After solidification the adhesive is exposed to conditions such as surface or atmospheric moisture. The silane reactive hot melt adhesive cures to an irreversible solid during exposure to water or moisture, when the silane groups are hydrolyzed to silanol groups which can condense with each other or with reactive species on the adherent surfaces. As used herein, "irreversible solid form" means a solid form wherein the silane reactive hot melt adhesive composition has reacted with moisture to produce a cured, thermoset, insoluble material.

The silane reactive hot melt adhesive compositions are useful for bonding articles composed of a wide variety of substrates (materials), including but not limited to wood, metal, polymeric plastics, glass and textiles. Non-limiting uses include use by consumers in hot glue guns and use in roll coating equipment for lamination of panels.

Application temperatures of the silane reactive hot melt adhesive compositions are determined by the thermal stability of the composition and the heat sensitivity of the substrates. Preferred application temperatures are above 80° C. and below 200° C., more preferably below 180° C., and most preferably below 150° C.

The silane reactive hot melt adhesive compositions may be then applied in molten form to substrates using a variety of application techniques known in the art. Examples includes hot melt glue gun, hot melt slot-die coating, hot melt wheel coating, hot melt roller coating, melt blown coating, spiral spray and the like.

The invention is further illustrated by the following non-limiting examples.

EXAMPLES

The following tests were used in the Examples.

Viscosity—viscosity was measured using a Brookfield viscometer with a Thermosel heating unit and spindle 27. Desirably, viscosity of the silane reactive hot melt adhesive composition should be 10,000 to 100,000 cps at 250° F.

Final (cured) strength by Lap Shear Adhesion Test (TLS)—The adhesive was applied to a clean substrate. A stainless steel drawdown applicator (BYK-Gardner) was used to obtain a controlled thickness of 2 mm. Clean strips 1 inch by 4 inches were bonded to the applied adhesive with an overlapping area of 1 inch by 1 inch using hand pressure. The finished bonds were conditioned at 72° F./50% RH. Tensile tests were conducted after 1 day cure for adhesion development test, and after two weeks to allow for full moisture cure for final adhesion. Tensile samples were pulled along the long axis at 4 inches/min until failure in an Instron tensile test machine at room temperature. Test results are measured in psi (pounds per square inch). A higher test result indicates a higher adhesion. Substrates used include wood (ponderosa pine), high pressure laminate (HPL), cold rolled steel (CRS), aluminum (Al), polymethyl methacrylate (PMMA), polycarbonate (PC) and particle board (PB).

Adhesion development by TLS—Lap shear bonds were made and tested as described above, but were tested in a short time of cure, 1 day after bonding. This test characterizes the ability of the bonded structure to survive handling in manufacture prior to full cure. A higher test result indicates better performance.

The following materials were used in the Examples.

Desmophen S 105-30 is a solvent-free saturated polyester polyol resin available from Bayer Materialscience LLC.

Dynacol 7360 is solvent-free, semicrystalline, saturated linear polyester polyol resin available from Evonik Corp.

MDI is methylene diphenyl diisocyanate available as grade Mondur M from Bayer Corp.

IPDI is isophorone diisocyanate available as grade Desmodur I from Bayer Material Science or available as Vestanant IPDI from Evonik Corp.

MAX 951 is a low modulus silane terminated polyether polymer, commercially available from Kaneka Corp.

Poly(propylene carbonate) polyol is available as PPC-2-PG from Novomer Inc.

DMDEE is bis(2-morpholinoethyl) ether available from VWR Inc.

Aminopropyltrimethoxysilane has primary amino group. It's available as Silquest A1110 from Momentive Performance Materials or available as Dynasylan AMMO from Evonik Corp.

BYK A515 is an air release agent, available from BYK Chemie.

Sivo 203 is an oligomeric aminosilane adhesion promoter available from Evonik Corp.

Dynasylan MEMO is a methylacrylopropyltrimethoxysilane adhesion promoter available from Evonik Corp.

REAXIS C325 is a liquid dibutyltin dilaurate catalyst available from Reaxis Inc.

REAXIS C716 is liquid Bismuth Neodecanoate catalyst available from Reaxis Inc.

Novomer PPC-2-PPG is a polycarbonate polyol available from Novomer Inc.

All amounts in the Examples are parts by weight unless otherwise indicated.

Example 1

A silane modified polyester polymer was prepared by reacting 370 parts by weight of Desmophen S 105-30 and 50 parts by weight MDI to form a NCO functional intermediate compound. 36.2 parts by weight of Silquest A1110 was reacted with the above intermediate compound to form the silane modified polyester polymer. After the Silquest A1110 was reacted, titration analysis of the reaction product showed no free isocyanate.

The silane modified polyester polymer was combined with 90 parts by weight of silane reactive plasticizer (MAX951) and 1.6 parts by weight DMDEE to form silane reactive hot melt adhesive composition 1.

Silane reactive hot melt composition 1 was tested against two commercially available hot melt adhesives (A and B). Adhesion strength development results are shown in the following table.

|  | composition | | |
| --- | --- | --- | --- |
|  | A[1] | B[2] | 1 |
| tensile strength bonding HPL to CRS | | | |
| 2 hours (adhesion strength) (psi) | 3.5 | 50 | 363 |
| 1 week (final strength) (psi) | 34 | 216 | 780 |
| tensile strength bonding HPL to PB | | | |
| 2 hours (adhesion strength) (psi) | 4 | 90 | 339 |
| 1 week (final strength) (psi) | 47 | 349 | 210 |

[1]A is a silane reactive hot melt adhesive similar to PURMELT S100A available from Henkel Corp.
[2]B is PURMELT reactive polyurethane hot melt adhesive available from Henkel Corp.

In comparison to current silane cure hot melt adhesive A and polyurethane hot melt adhesive B, the new silane reactive hot melt composition 1 has a much higher green strength after 2 hours on both HPL/CRS and HPL/PB, and also much higher adhesion strength after cure for 1 week.

Example 2

Samples of a silane reactive hot melt adhesive composition were prepared with formulations shown in the following table. The polyester polyol was reacted with polyisocyanate to form an intermediate material having isocyanate moieties. The silane reactive plasticizer was mixed in. Aminosilane reagent was added to the mixture to react with the intermediate material having isocyanate moieties. After the aminosilane was reacted, titration analysis of the reaction product showed no free isocyanate. Once the reaction was completed the remaining ingredients were added and mixed to form the silane reactive hot melt adhesive compositions. The silane reactive hot melt compositions were tested for green strength and final strength. Results are shown in the following table.

|  | composition | | | | |
| --- | --- | --- | --- | --- | --- |
|  | 1 | 2 | 3 | 4 | 5 |
| polyester polyol[1] | 370 | 250 | 340 | 500 | 450 |
| MDI | 50 | 30 | 45 | 0 | 0 |
| IPDI | 0 | 0 | 0 | 61 | 55 |
| aminosilane reagent[2] | 36 | 19 | 32 | 41 | 36 |
| silane reactive plasticizer[3] | 90 | 210 | 120 | 11 | 220 |
| air release agent[4] | 3 | 3 | 3 | 4 | 4 |
| catalyst[5] | 1.6 | 1.6 | 1.6 | 0 | 0 |
| adhesion promotor[6] | 0 | 0 | 0 | 8 | 8 |
| total parts by weight | 551 | 514 | 541 | 625 | 772 |
| weight ratio of polyester polyol to silane reactive plasticizer in hot melt adhesive composition | 4.1 | 1.2 | 2.8 | 44.6 | 2 |
| viscosity (cps at 250° F.) | 68250 | paste | 56000 | 7750 | 36700 |
| tensile strength bonding wood to PC | | | | | |
| 1 day (green strength) (psi) | 83 | 0 | 140 | 31 | 486 |
| 2 weeks (final strength) (psi) | 599 | 0 | 181 | 191 | 490 |
| tensile strength bonding wood to PMMA | | | | | |
| 1 day (adhesion strength) (psi) | 524 | 0 | 290 | 180 | 314 |
| 2 weeks (final strength) (psi) | 540 | 0 | 296 | 235 | 392 |
| tensile strength bonding wood to wood | | | | | |
| 1 day (adhesion strength) (psi) | 647 | 0 | 350 | N/A | N/A |
| 2 weeks (final strength) (psi) | >557 | 0 | 461 | N/A | N/A |

[1]Desmophen S 105-30
[2]Silquest A-1110
[3]MAX 951
[4]BYK A-515
[5]DMDEE
[6]Sivo 203

Composition 1 has much better adhesion overall than composition 3, which in turn has better adhesion than composition 2. Composition 2 remains as a paste and no adhesion strength developed. This shows the ratio of polyester polyol to silane reactive plasticizer is advantageously greater than 1.2 parts polyester polyol to 1 part silane reactive plasticizer.

Example 3

Samples of a silane reactive hot melt adhesive composition were prepared with formulations shown in the following table. The polyester polyol was reacted with polyisocyanate to form an intermediate material having isocyanate moieties. The silane reactive plasticizer was mixed in. Aminosilane reagent was added to the mixture to react with the intermediate material having isocyanate moieties. After the aminosilane was reacted, titration analysis of the reaction product showed no free isocyanate. Once the reaction was completed the remaining ingredients were added and mixed to form the silane reactive hot melt adhesive compositions. The silane reactive hot melt compositions were tested for green strength and final strength. Results are shown in the following table.

|  | composition | | | | |
| --- | --- | --- | --- | --- | --- |
|  | 6 | 7 | 8 | 1 | 10 |
| polyester polyol[1] parts by weight | 370 | 370 | 370 | 370 | 500 |
| polyester polyol[1] equivalents | 0.20 | 0.20 | 0.20 | 0.20 | 0.27 |
| MDI parts by weight | 35 | 40 | 45 | 50 | 0 |
| MDI equivalents | 0.28 | 0.32 | 0.36 | 0.40 | 0 |
| IPDI parts by weight | 0 | 0 | 0 | 0 | 61 |
| IPDI equivalents | 0 | 0 | 0 | 0 | 0.55 |
| aminosilane reagent[2] | 14.6 | 21.8 | 29 | 36.2 | 41 |
| ratio of isocyanate equivalents to polyester polyol equivalents | 1.4 | 1.6 | 1.8 | 2.0 | 2.1 |
| silane reactive plasticizer[3] | 90 | 90 | 90 | 90 | 112 |

|  | composition | | | | |
| --- | --- | --- | --- | --- | --- |
|  | 6 | 7 | 8 | 1 | 10 |
| BYK A-515 | 3 | 3 | 3 | 3 | 3.8 |
| DMDEE | 1.6 | 1.6 | 1.6 | 1.6 | 0 |
| Sivo 203 | 0 | 0 | 0 | 0 | 7.5 |
| total parts | 514 | 526 | 539 | 551 | 726 |
| weight ratio polyester polyol to silane reactive plasticizer in hot melt adhesive composition | 4.1 | 4.1 | 4.1 | 4.1 | 4.5 |
| viscosity (cps at 250° F.) | gelled | 135000 | 71000 | 68250 | 59750 |
| tensile strength bonding wood to PC | | | | | |
| 1 day (adhesion strength) (psi) | N/A | 312 | 489 | 83 | 553 |
| 2 weeks (final strength) (psi) | N/A | 512 | >43 | 599 | 486 |
| tensile strength bonding wood to PMMA | | | | | |
| 1 day (adhesion strength) (psi) | N/A | 312 | 290 | 524 | 382 |
| 2 weeks (final strength) (psi) | N/A | 310 | 682 | 540 | 497 |
| tensile strength bonding wood to wood | | | | | |
| 1 day (adhesion strength) (psi) | N/A | 411 | 590 | 647 | N/A |
| 2 weeks (final strength) (psi) | N/A | 529 | >407 | >557 | N/A |

[1]Desmophen S 105-30
[2]Silquest A-1110
[3]MAX 951

Example 4

Samples of a silane reactive hot melt adhesive composition were prepared with formulations shown in the following table. The polyester polyol was reacted with polyisocyanate to form an intermediate material having isocyanate moieties. The silane reactive plasticizer was mixed in. Aminosilane reagent was added to the mixture to react with the intermediate material having isocyanate moieties. After the aminosilane was reacted, titration analysis of the reaction product showed no free isocyanate. Once the reaction was completed the remaining ingredients were added and mixed to form the silane reactive hot melt adhesive compositions. The silane reactive hot melt compositions were tested for green strength and final strength. Results are shown in the following table.

|  | composition | |
| --- | --- | --- |
|  | 11 | 12 |
| polyester polyol[1] parts by weight | 500 | 500 |
| polyester polyol[1] equivalents | 0.27 | 0.27 |
| IPDI parts by weight | 45 | 51 |
| IPDI equivalents | 0.40 | 0.46 |
| aminosilane reagent[2] | 24.1 | 33.7 |
| ratio of isocyanate equivalents to polyester polyol equivalents | 1.5 | 1.7 |
| silane reactive plasticizer[3] | 112 | 112 |
| BYK A-1790 | 3.8 | 3.8 |
| Silquest A-174 | 0 | 35 |
| Sivo 203 | 7.5 | 7.5 |
| total parts | 692.6 | 743.2 |
| weight ratio of polyester polyol to silane reactive plasticizer in hot melt adhesive composition | 4.4 | 4.4 |
| viscosity (cps at 250° F.) | 83750 | 19800 |
| tensile strength bonding wood to PC | | |
| 1 day (adhesion strength) (psi) | 175 | 284 |
| 2 weeks (final strength) | 298 | 382 |
| tensile strength bonding wood to PMMA | | |
| 1 day (adhesion strength) (psi) | 557 | 511 |
| 2 weeks (final strength) (psi) | 813 | 562 |
| tensile strength bonding wood to wood | | |
| 1 day (adhesion strength) (psi) | 448 | 414 |
| 2 weeks (final strength) (psi) | 557 | 657 |

[1]Dynacol 7360
[2]Silquest A-1110
[3]MAX 951

The silane reactive hot melt compositions in examples 3 and 4 have very good adhesion results with the exception of composition 6. Composition 1 is the best with good adhesion and medium viscosity at application temperature. The adhesion results indicate that the equivalence ratio of isocyanate to polyester polyol needs to be >1, and advantageously >1.4.

Example 5

Samples of a silane reactive hot melt adhesive composition were prepared with formulations shown in the following table. The polyester polyol was reacted with polyisocyanate to form an intermediate material having isocyanate moieties. The silane reactive plasticizer was mixed in. Aminosilane reagent was added to the mixture to react with the intermediate material having isocyanate moieties. After the aminosilane was reacted, titration analysis of the reaction product showed no free isocyanate. Once the reaction was completed the remaining ingredients were added and mixed to form the silane reactive hot melt adhesive compositions. The silane reactive hot melt compositions were tested for green strength and final strength. Results are shown in the following table.

|  | composition | |
|---|---|---|
|  | 13 | 14 |
| polyester polyol[1] | 500 | 500 |
| MDI parts by weight | 69 | 69 |
| aminosilane reagent[2] | 45 | 45 |
| silane reactive plasticizer[3] | 112 | 112 |
| air release agent[4] | 4 | 4 |
| catalyst[5] | 2 | 0 |
| total parts | 732 | 730 |
| weight ration of polyester polyol to silane reactive plasticizer in hot melt adhesive composition | 4.4 | 4.4 |
| viscosity (cps at 250° F.) | 49300 | 44000 |
| tensile strength bonding wood to PC | | |
| 1 day (adhesion strength) (psi) | 528 | 638 |
| 2 weeks (final strength) (psi) | 672 | 558 |
| tensile strength bonding wood to PMMA | | |
| 1 day (adhesion strength) (psi) | 414 | 391 |
| 2 weeks (final strength) (psi) | 534 | 461 |
| tensile strength bonding CRS to HPL | | |
| 1 day (adhesion strength) (psi) | 789 | 593 |
| 2 weeks (final strength) (psi) | 945 | 765 |

[1]Desmophen S 105-30
[2]Silquest A-1110
[3]MAX 951
[4]BYK A-515
[5]DMDEE

These results indicate that composition 14 gave overall comparable adhesion values to composition 13 even through it does not contain DMDEE catalyst.

Example 6

Samples of a silane reactive hot melt adhesive composition were prepared with formulations shown in the following table. The polyester polyol was reacted with polyisocyanate to form an intermediate material having isocyanate moieties. The silane reactive plasticizer was mixed in. Aminosilane reagent was added to the mixture to react with the intermediate material having isocyanate moieties. After the aminosilane was reacted, titration analysis of the reaction product showed no free isocyanate. Once the reaction was completed the remaining ingredients were added and mixed to form the silane reactive hot melt adhesive compositions. The silane reactive hot melt compositions were tested for green strength and final strength. Results are shown in the following table.

|  | composition | | |
|---|---|---|---|
|  | 15 | 16 | 17 |
| polyester polyol[1] | 500 | 500 | 500 |
| IPDI parts by weight | 61 | 51 | 61 |
| aminosilane endcapping reagent[2] | 41 | 31 | 44 |
| silane reactive plasticizer[3] | 112 | 112 | 112 |
| air release agent[4] | 3.8 | 3.8 | 3.8 |
| catalyst[5] | 0 | 0 | 0 |
| adhesion promotor[6] | 8 | 8 | 8 |
| adhesion promotor[7] | 0 | 34 | 46 |
| total parts | 726 | 740 | 775 |
| weight ratio of polyester polyol to silane reactive plasticizer in hot melt adhesive composition | 4.4 | 4.4 | 4.4 |
| viscosity (cps at 250° F.) | 59750 | 31800 | 17100 |
| tensile strength bonding wood to PC | | | |
| 1 day (adhesion strength) (psi) | 553 | 313 | 508 |
| 2 weeks (final strength) (psi) | 486 | 617 | 520 |
| tensile strength bonding wood to PMMA | | | |
| 1 day (adhesion strength) (psi) | 382 | 792 | 568 |
| 2 weeks (final strength) (psi) | 497 | 703 | 555 |
| tensile strength bonding AL to wood | | | |
| 1 day (adhesion strength) (psi) | N/A | 471 | 595 |
| 2 weeks (final strength) (psi) | N/A | 514 | 565 |

[1]Desmophen S 105-30
[2]Silquest A-1110
[3]MAX 951
[4]BYK A-515
[5]DMDEE
[6]Sivo 203
[7]Dynasylan MEMO These data indicates that addition of other types of silanes such as Dynasylan MEMO also helps to adhesion, especially on PMMA substrates.

Example 7

Samples of a silane reactive hot melt adhesive composition were prepared with formulations shown in the following table. Examples 18 and 19 include dibutyltin dilaurate (DBTDL) catalyst. Example 20 includes dibutyltin dilaurate (DBTDL) and DMDEE catalysts. Examples 21 and 22 include a Bismuth catalyst.

The polyester polyol was reacted with polyisocyanate to form an intermediate material having isocyanate moieties. The silane reactive plasticizer was mixed in. Aminosilane reagent was added to the mixture to react with the intermediate material having isocyanate moieties. After the aminosilane was reacted, titration analysis of the reaction product showed no free isocyanate. Once the reaction was completed the remaining ingredients were added and mixed to form the silane reactive hot melt adhesive compositions. The silane reactive hot melt compositions were tested for green strength and final strength. Results are shown in the following table.

|  | composition | | | | |
|---|---|---|---|---|---|
|  | 18 | 19 | 20 | 21 | 22 |
| Tin catalyst[1] | 3 | 0.3 | 0.6 | 0 | 0 |
| Bismuth catalyst[2] | 0 | 0 | 0 | 0.4 | 0.4 |

-continued

|  | composition | | | | |
| --- | --- | --- | --- | --- | --- |
|  | 18 | 19 | 20 | 21 | 22 |
| polyester polyol[3] | 500 | 500 | 500 | 500 | 500 |
| IPDI | 61.2 | 50.7 | 61.2 | 50.7 | 50.7 |
| aminosilane reagent[4] | 46.4 | 33.7 | 41 | 33.7 | 33.7 |
| Silquest A-174 | 0 | 35 | 0 | 35 | 35 |
| silane reactive plasticizer[5] | 112.5 | 112.5 | 112.5 | 112.5 | 112.5 |
| air release agent[6] | 3.8 | 3.8 | 3.8 | 3.8 | 3.8 |
| catalyst[7] | 0 | 0 | 2 | 0 | 0 |
| adhesion promotor[8] | 7.5 | 7.5 | 7.5 | 7.5 | 7.5 |
| total parts | 734.5 | 743.5 | 728 | 743.6 | 743.6 |
| weight ration of polyester polyol to silane reactive plasticizer in hot melt adhesive composition | 4.4 | 4.4 | 4.4 | 4.4 | 4.4 |
| viscosity (cps at 250° F.) | 8850 | 20200 | 194500 gel 2 hrs | 10500 | 9350 |
| tensile strength bonding wood to PC | | | | | |
| 1 day (green strength) (psi) | 378 | 211 | 409 | 175 | 89 |
| 2 weeks (final strength) (psi) | 262 | 0 | 265 | 21 | 21 |
| tensile strength bonding wood to PMMA | | | | | |
| 1 day (adhesion strength) (psi) | 24.5 | 62.3 | 133 | 60 | 0 |
| 2 weeks (final strength) (psi) | 31.2 | 0 | 124 | 0 | 0 |
| tensile strength bonding wood to wood | | | | | |
| 1 day (adhesion strength) (psi) | 409 | 356 | N/A | 240 | 376 |
| 2 weeks (final strength) (psi) | 350 | 441 | N/A | 368 | 315 |
| PVC/glass | | | | | |
| 1 day | 121 | 296 | 180 | 151 | 263 |
| 2 weeks | 32 | 288 | 239 | 295 | 356 |
| aluminum/wood | | | | | |
| 1 day | 25 | 1.7 | 164 | 63 | 58 |
| 2 weeks | 3.7 | 0 | 197 | 0 | 21 |

[1]REAXIS C325
[2]REAXIS C716
[3]Desmophen S 105-30
[4]Silquest A-1110
[5]MAX 951
[6]BYK A-515
[7]DMDEE
[8]Sivo 203

The batches with Tin catalyst have poor adhesion overall, esp. on PMMA and Al substrates. The batch with both Tin catalyst and DMDEE gelled unacceptably.

Example 8

Samples of a silane reactive hot melt adhesive composition were prepared with formulations shown in the following table. The polyester polyol and polycarbonate polyol were combined and reacted with polyisocyanate to form an intermediate material having isocyanate moieties. Aminosilane reagent was added to the mixture to react with the intermediate material having isocyanate moieties. After the aminosilane was reacted, titration analysis of the reaction product showed no free isocyanate. Once the reaction was completed the remaining ingredients were added and mixed to form the silane reactive hot melt adhesive compositions. The silane reactive hot melt compositions were tested for green strength and final strength. Results are shown in the following table.

|  | composition | |
| --- | --- | --- |
|  | 23 | 24 |
| polyester polyol[1] parts by weight | 500 | 500 |
| IPDI parts by weight | 91.1 | 77.9 |
| aminosilane reagent[2] | 76.4 | 66.1 |
| ratio of isocyanate equivalents to polyester polyol equivalents | | |
| polycarbonate polyol[3] | 112.5 | 56 |
| BYK A-1790 | 3.8 | 3.8 |
| Sivo 203 | 7.5 | 7.5 |
| total parts | 791.4 | 711.4 |
| weight ratio of polyester polyol to polycarbonate plasticizer in hot melt adhesive composition | 4.4 | 8.9 |
| viscosity (cps at 250° F.) | 5913 | 7825 |
| tensile strength bonding wood to PC | | |
| 1 day (adhesion strength) (psi) | 511 | 425 |
| 2 weeks (final strength) | 416 | 237 |

-continued

| | composition | |
|---|---|---|
| | 23 | 24 |
| tensile strength bonding wood to PMMA | | |
| 1 day (adhesion strength) (psi) | 490 | 276 |
| 2 weeks (final strength) (psi) | 285 | 202 |
| tensile strength bonding PVC/glass | | |
| 1 day (adhesion strength) (psi) | 204 | 222 |
| 2 weeks (final strength) (psi) | 312 | 253 |
| tensile strength bonding Al/wood | | |
| 1 day | 438 | 760 |
| 2 weeks | 483 | 508 |

[1]Desmophen S105-30
[2]silquest A-1110
[3]Novomer PPC-2-PG

These samples replace the polyether backbone silane reactive plasticizer with polycarbonate backbone silane reactive plasticizer. The adhesion values for silane reactive hot melt adhesive compositions made using polycarbonate based silane reactive plasticizer are comparable to adhesion values for silane reactive hot melt adhesive compositions made using polyether based silane reactive plasticizer. The adhesion values for silane reactive hot melt adhesive compositions comprising polycarbonate based silane reactive plasticizer are especially strong on aluminum substrates.

Example 9

Samples of a silane reactive hot melt adhesive composition were prepared with formulations shown in the following table.

For sample 25 the polyester polyol and isocyanato-propyl-trimethoxysilane were reacted. Once the reaction was complete the silane reactive plasticizer and remaining ingredients were added and mixed to form the silane reactive hot melt adhesive compositions. The silane reactive hot melt composition was tested for green strength and final strength.

For sample 26 the polyester polyol was reacted with polyisocyanate to form an OH functional intermediate. The intermediate was reacted with isocyanato-propyl-trimethoxysilane to form a silane modified polyester polymer. The silane reactive plasticizer was added to the silane modified polyester polyol and the remaining ingredients were added and mixed to form the silane reactive hot melt adhesive composition. The silane reactive hot melt composition was tested for green strength and final strength. Results are shown in the following table.

| | composition | |
|---|---|---|
| | 25 | 26 |
| polyester polyol[1] | 500 | 500 |
| MDI parts by weight | 0 | 16.7 |
| Isocyanato-propyl-trimethoxysilane[2] | 66.1 | 33 |
| silane reactive plasticizer[3] | 112.5 | 112.5 |
| air release agent[4] | 3.8 | 3.8 |
| catalyst[5] | 2 | 0 |
| total parts | 684.4 | 666 |
| weight ration of polyester polyol to plasticizer in hot melt adhesive composition | 4.4 | 4.4 |
| viscosity (cps at 250° F.) | 1790 | 51900 |
| tensile strength bonding wood to PC | | |
| 1 day (adhesion strength) (psi) | 58 | 302 |
| 2 weeks (final strength) (psi) | 77 | 421 |
| tensile strength bonding wood to PMMA | | |
| 1 day (adhesion strength) (psi) | 64 | 74 |
| 2 weeks (final strength) (psi) | 59 | 91 |
| tensile strength bonding AL to wood | | |
| 1 day (adhesion strength) (psi) | 47 | 147 |
| 2 weeks (final strength) (psi) | 58 | 355 |
| tensile strength steel/HPL | | |
| 1 day (adhesion strength) (psi) | 26 | 0 |
| 2 weeks (final strength) (psi) | 77 | 0 |
| PVC/glass | | |
| 1 day (adhesion strength) (psi) | 9 | 215 |
| 2 weeks (final strength) (psi) | 68 | 230 |

[1]Desmophen S 105-30
[2]SILQUEST A-link 25
[3]MAX 951
[4]BYK A-515
[5]DMDEE

The test results indicate that the products made by this approach generally have less than acceptable adhesion on most substrates, with a few exceptions.

Many modifications and variations of this invention can be made without departing from its spirit and scope, as will be apparent to those skilled in the art. The specific embodiments described herein are offered by way of example only, and the invention is to be limited only by the terms of the appended claims, along with the full scope of equivalents to which such claims are entitled.

The invention claimed is:
1. A moisture curable composition comprising:
   60 to 95 weight percent of a reaction product of (i) a semi-crystalline polyol and (ii) a polyisocyanate and (iii) a primary aminosilane; and
   5 to 35 weight percent of a silane reactive plasticizer.
2. The moisture curable composition of claim 1 wherein the equivalent ratio of polyisocyanate (ii) to semi-crystalline polyol (i) is >1.4.
3. The moisture curable composition of claim 1 wherein the ratio of equivalents of primary aminosilane (iii) to [equivalents of polyisocyanate (ii)–equivalents of semi-crystalline polyol (i)] is about 1 or greater.
4. The moisture curable composition of claim 1 being free of water and solvent.
5. The moisture curable composition of claim 1 wherein the equivalent ratio of polyisocyanate (ii) to semi-crystalline polyol (i) is >1.
6. The moisture curable composition of claim 1 further comprising adhesion promoter.
7. The moisture curable composition of claim 1 further comprising an aminosilane adhesion promoter.
8. The moisture curable composition of claim 1 wherein the equivalent ratio of isocyanate to polyol is greater than 1 to 1.
9. The moisture curable composition of claim 1 wherein the equivalent ratio of isocyanate to polyol is greater than 1.6 to 1.

10. The moisture curable composition of claim 1 further comprising one or more of a tackifier; an acrylic polymer; and a catalyst.

11. The moisture curable composition of claim 1 wherein the semi-crystalline polyol is a semi-crystalline polyester polyol and a weight ratio of polyester polyol to silane reactive plasticizer is greater than 1 part polyester polyol to 1 part silane reactive plasticizer.

12. The moisture curable composition of claim 1 wherein the semi-crystalline polyol is a semi-crystalline polyester polyol and a weight ratio of polyester polyol to silane reactive plasticizer is greater than 1.2 parts polyester polyol to 1 part silane reactive plasticizer.

13. The moisture curable composition of claim 1 wherein the silane reactive plasticizer comprises at least one silyl group with a formula of $$R\text{-}[A\text{-}Si(C_xH_{2x+1})_n(OH)_{3-n}]_z$$

or $$R\text{-}[A\text{-}Si(C_xH_{2x+1})_n(OC_yH_{2y+1})_{3-n}]_z$$

wherein
R is a polymer backbone;
A is a linkage to the polymer backbone;
x is 1 to 12;
y is 1 to 12; and
n is 0, 1 or 2
z is 1 or 2.

14. The moisture curable composition of claim 13, wherein polymer backbone R is selected from silicone, polyether, polycarbonate, polyisobutylene, ethylene vinyl acetate and polyacrylate.

15. The moisture curable composition of claim 1 being free of isocyanate monomer.

16. The moisture curable composition of claim 1 comprising about 70 to about 90 weight percent reaction product and about 10 to about 30 weight percent silane reactive plasticizer.

17. A method of applying a moisture curable composition comprising:
providing the moisture curable composition of claim 1 in solid form at room temperature;
heating the moisture curable composition to a molten state at the point of use;
applying the molten moisture curable composition to a first substrate;
bringing a second substrate in contact with the molten moisture curable composition applied to the first substrate;
cooling the applied molten moisture curable composition to a solid state;
subjecting the cooled composition to conditions sufficient to irreversibly cure the cooled composition to form a bond between the first and second substrates.

18. An article of manufacture comprising the moisture curable composition of claim 1.

19. A moisture curable hot melt adhesive comprising the moisture curable composition of claim 1.

20. The moisture curable composition of claim 1 in cured form.

21. The moisture curable composition of claim 1, wherein the silane reactive plasticizer is a liquid at room temperature and polymer backbone R is selected from polyether, polycarbonate, polyisobutylene, and polyacrylate.

22. The moisture curable composition of claim 1 wherein the reaction product comprises a plurality of terminal silyl groups each independently having a formula of:

$$-\!Si(C_xH_{2x+1})_n(OC_yH_{2y+1})_{3-n}$$

wherein
n=0, 1 or 2;
x and y are, independently a number from 1 to 12.

* * * * *